(12) United States Patent
Hatjasalo et al.

(10) Patent No.: US 6,524,659 B1
(45) Date of Patent: Feb. 25, 2003

(54) METHOD AND APPARATUS FOR ELECTRICALLY CONTROLLING A FLOW OF MATERIAL

(75) Inventors: Leo Hatjasalo, Helsinki (FI); Jarkko Valtanen, Helsinki (FI)

(73) Assignee: Oy OMS Optomedical Systems Ltd., Helsinki (FI)

( * ) Notice: Subject to any disclaimer, the term of this patent is extended or adjusted under 35 U.S.C. 154(b) by 0 days.

(21) Appl. No.: 09/700,471

(22) PCT Filed: Apr. 28, 1999

(86) PCT No.: PCT/FI99/00341

§ 371 (c)(1), (2), (4) Date: Nov. 15, 2000

(87) PCT Pub. No.: WO99/59735

PCT Pub. Date: Nov. 25, 1999

(30) Foreign Application Priority Data

May 15, 1998 (FI) .................................................. 981082

(51) Int. Cl.[7] .................................................. B05D 1/32
(52) U.S. Cl. .................. 427/466; 118/300; 118/308; 118/311; 118/312; 118/624; 118/641; 118/665; 118/688; 118/689; 118/690; 118/708; 118/712; 427/8; 427/9; 427/195; 427/196; 427/197; 427/256; 427/422; 427/485; 427/561
(58) Field of Search .................. 427/8, 9, 466, 427/485, 561, 195, 196, 197, 256, 422; 118/665, 688, 689, 690, 708, 712, 624, 641, 300, 308, 311, 312

(56) References Cited

U.S. PATENT DOCUMENTS 3,930,061 A 12/1975 Scharfenberger ............. 427/27

FOREIGN PATENT DOCUMENTS

EP 0 541 230 A2 5/1993
EP 0 623 782 A2 11/1994

*Primary Examiner*—Bernard Pianalto
(74) *Attorney, Agent, or Firm*—Connolly Bove Lodge & Hutz LLP; Larry J. Hume

(57) ABSTRACT

The invention relates to a method for electrically controlling a flow of material, wherein a single- or multi-component, essentially polymer-based material (1), such as plastics, elastomer or the like, is charged electrically (I) and sprayed (II) in an electrical field (E) to a three-dimensional mould (2)/target (3). The method of the invention makes use of the mould (2)/target (3) set at an electric potential and provided with two or more treatment blocks (Li) to be set at voltage levels different from each other, especially for coordinating the courses of sprayed material particles and the electrical field (E) affecting the same, in such a manner that each section/area of the mould/target surface forms a material layer of desirable thickness in the spraying cycle (II). The invention relates also to an apparatus operating in accordance with the method.

37 Claims, 2 Drawing Sheets

METHOD AND APPARATUS FOR ELECTRICALLY CONTROLLING A FLOW OF MATERIAL

The present invention relates to a method and an apparatus for electrically controlling a flow of material, wherein a single- or multi-component, essentially polymer-based material, such as plastics, elastomer or the like, is charged electrically and sprayed in an electrical field to a three-dimensional mould/target.

At present, it is conventional to employ so-called electrostatic coating e.g. in automotive painting. This application is generally carried out by using metal-based coating materials, whose electrical charge and spraying in an electrical field can be achieved in the discussed application in a sufficiently homogeneous manner, such that the automobile is provided all over with a sufficiently thick layer of paint. However, the above type processing is inconvenient to carry out in practice with a sufficient reliability, especially when used in connection with plastic-based materials because of a poor applicability of this type of materials to the discussed processing. On the other hand, it is perfectly well known to provide the plastics to be sprayed with an electrical charge by using suitable polarity/resistivity regulating materials, such as chlorine-/glycol-based materials or the like. Despite this, however, this type of electrical processing of a plastic material has not been possible to perform thus far with a sufficient reliability, which is why e.g. conventional thin-walled ordinary articles, such as gloves, condoms or the like, must still be manufactured largely by using a traditional dip process.

On the other hand, the International patent publication WO 94/22594 discloses a process for coating especially objects with varying shapes, which is based on the fact that a multi-component material, one comprising a cold curing and inert, e.g. solvent-free resin, is electrostatically applied to a surface of an object, whereafter at least one fluid material is sprayed onto the resin before it has cured.

The cited publication does not present any concrete solution for performing the above-described task, as it mostly discloses various alternative working principles for providing a coating. On the basis of technology described in the cited publication, it is not possible in practice to make sure that especially a flow of resin-based, electrically processible material be applied particularly to a multi-dimensionally shaped article in such a way that each area/point of the article would be provided exactly with a desired material thickness, which thus remains to be a central problem, especially in terms of processing resin- or plastic-based materials electrically.

An object of this intention is to provide a decisive remedy for the above-described problems and hence to raise substantially the available prior art. In order to achieve this object, a method of the invention is principally characterized in that the method makes use of a mould/target set at an electric potential, which is provided with two or more treatment blocks to be set at voltage levels different from each other, especially for coordinating the courses of sprayed material particles and the electrical field affecting the same, in such a manner that each section/area of the mould/target surface forms a material layer of desirable thickness in a spraying cycle II.

The method of the invention offers some major advantages, including e.g. its technical functionality and applicability, by virtue of which it is practically for the first time possible to provide a sufficiently reliable result in most diverse applications, even when using a plastic-based manufacturing material in connection with the above type of electrical processing. Usefulness of the method is based on the fact that a mould of the invention, by virtue of mathematically determined unequal voltage levels in the treatment blocks included therein, enables a precise determination of material thickness in such a way that the end result of actual processing is exactly as desired. The method of the invention also makes it possible that a target to be processed, such as an object to be coated or an article to be manufactured therefrom, be intentionally provided in desired areas with substantially unequal wall thicknesses. Furthermore, it is basically possible to apply the method in a traditional fashion, e.g. electrostatically, such that the predetermined voltage levels in the various processing blocks of a mould are kept essentially constant through the entire spraying cycle. On the other hand, it is also possible in this context to make use of a dynamically controlled spraying process in such a manner that one or several process parameters are changed continuously or periodically during a spraying cycle.

Preferred applications for the method of the invention are set forth in the non-independent claims directed to a method.

The invention relates also to an apparatus operating in accordance with a method for electrically controlling a flow of material, wherein a single- or multi-component, essentially polymer-based material or the like, is charged electrically (I) and sprayed (II) in an electrical field (E) to a three dimensional mould (2)/target (3), characterized in, that the method makes use of the mould (2)/target(3) set at an electric potential, which is provided with two or more treatment blocks (Li) to be set at voltage levels different from each other, especially for coordinating the courses of sprayed material particles and the electrical field (E) affecting the same, in such a manner that each section/area of the mould/target surface forms a material layer of desirable thickness in the spraying cycle (II).

The most important advantages offered by the apparatus of the invention include technical reliability in its operation and function as well as usefulness for the most diverse applications. First of all, the fundamental concept of the apparatus of the invention lies in the fact that a control unit included therein enables the setting of separate processing blocks included in a mould at e.g. mathematically predetermined voltage levels, such that the actual spraying process is capable of producing an absolutely controlled flow of material to each surface/wall of a mould/target to be treated/manufactured at a given time. Depending on the nature of a process, it is possible to arrange the control unit, e.g. according to a basically traditional approach, to operate so-called electrostatically in such a way that the predetermined voltage levels in the separate treatment blocks of a mould are substantially constant through the entire spraying cycle. On the other hand, it is also possible to make the control unit dynamical, such that certain process. parameters are changed continuously or by way of an on/off principle during the course of spraying. Another essential benefit gained by the apparatus of the invention is that, even when processing a multi-component material, it is possible to use just one spraying cycle to achieve a completely finished end result, which, thus, does not necessarily require any kind of finishing operations when using properly blended process materials, regarding e.g. colouring or other mechanical/physical characteristics, such as surface tension, surface strength or the like.

In the following specification, the invention will be described in more detail with reference made to the accompanying drawings, in which

The invention relates to a method for electrically controlling a flow of material, wherein a single- or multi-component, essentially polymer-based material 1, such as plastics, elastomer or the like, is charged electrically I and sprayed II in an electrical field E to a three-dimensional mould 2/target 3. The method of the invention makes use of the mould 2/target 3 set at an electric potential, which is provided with two or more treatment blocks Li to be set at voltage levels different from each other, especially for coordinating the courses of sprayed material particles and the electrical field E affecting the same, in such a manner that each section/area of the mould/target surface forms a material layer of desirable thickness in the spraying cycle II.

Figure 1:
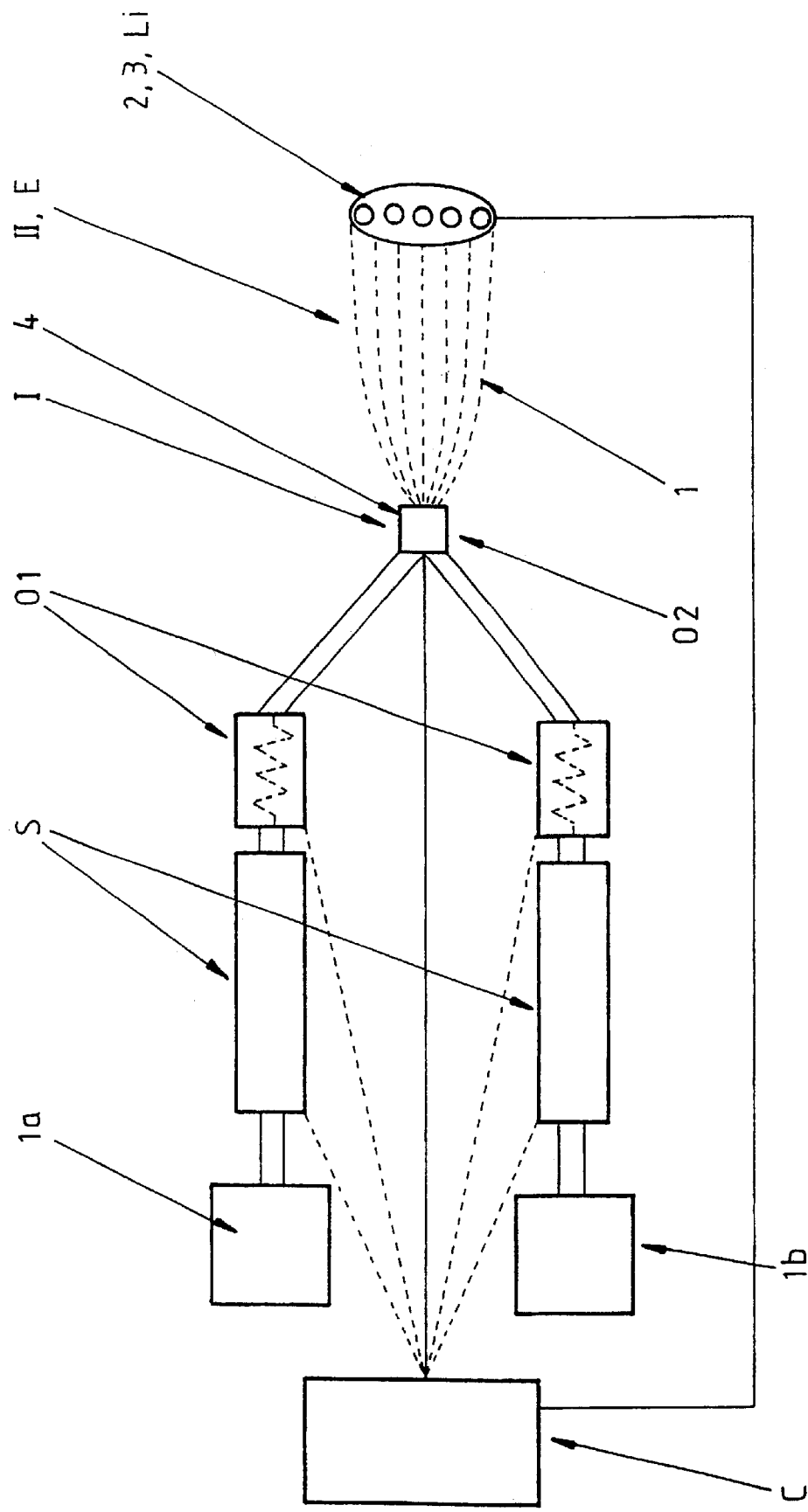
FIG. 1 shows the operating principle for a method and an apparatus of the invention.
Figure 2:
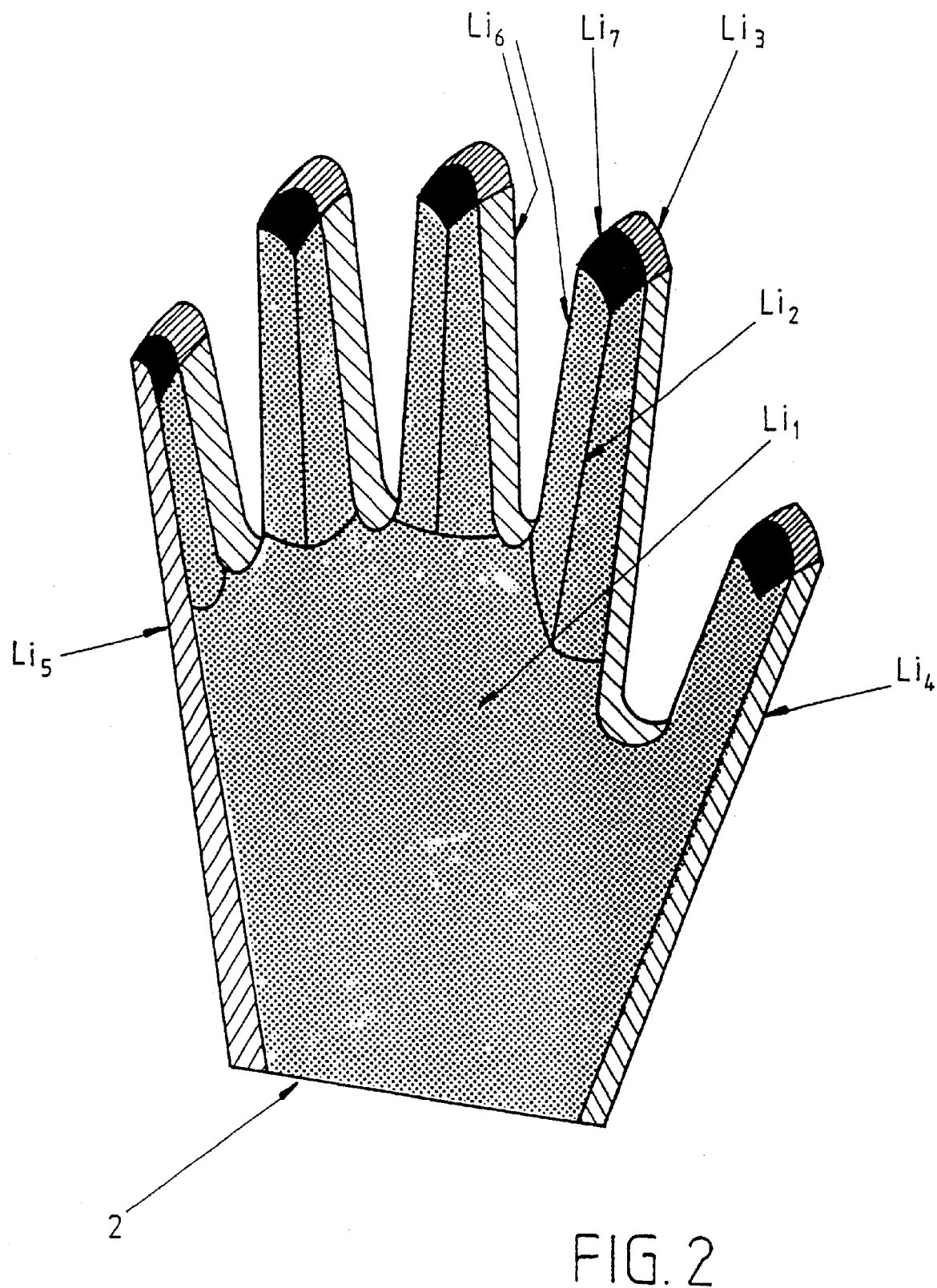
FIG. 2 shows by way of example a mould useful in connection with a method and an apparatus of the invention.

First of all, the method of the invention is based on the fact that a given target to be processed, e.g. a glove as depicted in FIG. 2, is previously modelled and this is used as a basis for determining calculated or so-called tabulated optimal voltage levels for each critical point/area of a target, such that the unequal voltage levels established in these areas serve either to boost or suppress the electrical field during the actual spraying II for a controlled management of the flows of material. The above features can be quite simply compiled in each treatment block by means of appropriately arranged wires or the like electrically conducting surfaces.

In a preferred application of the method, the treatment is performed in a static electrical field, such that the predetermined unequal voltage levels of separate treatment blocks $Li_1$–$Li_7$ in the mould 2/target 3 are maintained substantially constant through the entire spraying cycle.

Furthermore, in a preferred alternative application, the treatment is carried but in a dynamic electrical field by changing, during the course of spraying II, one or several process parameters, such as the volume flow, viscosity, and/or the like of a flow of material to be sprayed. In practice, however, the easiest approach is probably to change the electrical field E, such as the charge of a material to be sprayed and/or voltage levels of the mould 2/target 3. Furthermore, it is possible to change the voltage level of the treatment blocks Li during the course of spraying II dynamically within the limits of predetermined minimum and maximum voltage levels. Thus, in this context, it is possible to change e.g. the voltage level of a given treatment block Li in the mould continuously during the course of spraying or else by an on/off principle only. In a further preferred application of the method, it is possible to achieve the control of material particles to be sprayed by using mechanical control, such as narrow air jets, flows or the like, for intensifying the desired action, if necessary.

Furthermore, particularly in reference to the operating principle illustrated in FIG. 1, e.g. multi-component ingredients 1*a*, 1*b* pressurized with cylinders S are first heated by a heating unit 01, whereafter such materials are mixed 02 together by means of a spraying unit 4, such as a spray bell or the like, charged electrically I, and delivered as a material spray II.

Unlike the prior art solutions, the apparatus operating in accordance with the above-described method comprises a mould 2/target 3 to be particularly set at an electrical potential and provided, e.g. on the principle depicted in FIG. 2, with several treatment blocks Li to be set at voltage levels different from each other. Furthermore, in a preferred embodiment, the apparatus includes, according to the FIG. 1, a control unit C for changing the voltage levels of one or more process parameters, such as the volume flow of a material to be sprayed, its viscosity and/or the like and/or an electrical field E, such as the charge of a material to be sprayed and/or the voltage levels of a mould 2/target 3.

It is possible to adapt the control unit C to operate statically, as described above, or, on the other hand, also dynamically, e.g. such that the voltage level of a given treatment block/blocks Li in the mould 2/target 3 changes continuously within predetermined minimum and maximum voltage levels during the course of spraying II.

Particularly in reference the basic operating sketch shown in FIG. 1, the apparatus comprises a heating unit 01 intended for heating basic ingredients 1*a*, 1*b* pressurized by means of cylinders S, and a spraying unit 4, such as a spray bell or the like, for mixing 02 said materials together, for charging the same electrically I, and for producing a material spray II from the prepared manufacturing material 1.

It is obvious that the invention is not limited to the above-described or explained applications, but it can be subjected to major modifications within the scope of the basic inventional concept. Thus, it is naturally clear that the method of the invention can be utilized e.g. in surface finishing or in the manufacture of certain type of pieces in such a manner that, directly after the spraying cycle, the piece constitutes a finished end product after removing/separating the same from the mould. Especially in view of this type of applications, the present invention is particularly applicable in a type of operation disclosed in the Applicant's co-pending patent application "Method and apparatus for manufacturing a thin-walled article". Moreover, it is naturally obvious that the method and apparatus of the invention can be used for manufacturing rigid three-dimensional products/coatings as well as naturally also similar elastic products. In practical processing, the voltage level of the apparatus can be chosen to serve any given purpose the best possible way but, in principle, the type of equipment tested by the Applicant with a maximum voltage of about 100 kV is capable of achieving a sufficiently good end result in many different processes. Of course, it is also possible to carry out processing by using two or more spraying units e.g. facing each other and/or by moving the mould continuously or periodically during the spraying cycle.

What is claimed is:

1. An apparatus for controlling a flow and application of a material onto a three-dimensional target having two or more treatment blocks thereon, wherein the apparatus is suitable for electrically charging and spraying a polymer-based material in an electric field, the apparatus comprising:

- one or more pressurized cylinders each containing one or more components of the polymer-based material;
- a first spray unit which receives the one or more components of the polymer-based material under pressure from a respective one of the one or more pressurized cylinders and provides an electrical charge to the polymer-based material;
- a voltage application means for applying a voltage to each of the two or more treatment blocks; and
- an electric field establishing means for applying an electric field between the spray unit and the three-dimensional target,
- wherein the first spray unit sprays the polymer-based material toward the three-dimensional target so as to coat the polymer-based material onto each of the two or more treatment blocks to a desired thickness.

2. The apparatus of claim 1, further comprising a control unit which controls at least one process parameter selected from the group consisting of a pressure of the one or more pressurized cylinders, a volume flow of the polymer-based material through the first spray unit, a viscosity of the polymer-based material, a magnitude of the electric field applied, an amount of electrical charge imparted to the polymer-based material, and the voltage applied to each of the two or more treatment blocks.

3. The apparatus of claim 1, further comprising a control unit which individually controls the voltage applied to each of the two or more treatment blocks.

4. The apparatus of claim 3, wherein said control unit changes the voltage applied to at least one of said each of the two or more treatment blocks during a spraying operation.

5. The apparatus of claim 4, wherein the voltage change is controlled between a minimum voltage level and a maximum voltage level.

6. The apparatus of claim 4, wherein the control unit applies a different voltage to each of said two or more treatment blocks in accordance with a desired thickness of the polymer-based material on each of said two or more treatment blocks.

7. The apparatus of claim 1, further comprising a control unit which controls the viscosity of the polymer-based material.

8. The apparatus of claim 1, further comprising a control unit which controls the magnitude of the electric field applied between the first spray unit and the three-dimensional target.

9. The apparatus of claim 1, further comprising a control unit which controls the magnitude of the electrical charge imparted to the polymer-based material.

10. The apparatus of claim 1, further comprising a heating unit between said one or more pressurized cylinders and the spray unit.

11. The apparatus of claim 1, wherein the heating unit is controlled to provide a desired viscosity of the polymer-based material.

12. The apparatus of claim 1, wherein the first spray unit mixes the one or more components of the polymer-based material.

13. The apparatus of claim 1, wherein the first spray unit is a spray bell.

14. The apparatus of clam 1, further comprising a second spray unit arranged so that the three-dimensional target is between the first and second spray units.

15. The apparatus of claim 1, further comprising a movement means for moving the three-dimensional target during a spraying operation.

16. A method for controlling a flow and application of a material, the method comprising:
providing an electrically charged material;
providing a three dimensional target having two or more treatment blocks therein;
applying a voltage to each of the two or more treatment blocks;
establishing an electric field;
spraying the electrically charged material through the electric field and onto the three-dimensional target; and
separately controlling the thickness of material layers formed on each of the two or more treatment blocks of the three dimensional target.

17. The method of claim 16, further comprising moving the three-dimensional target during said spraying step.

18. The method of claim 16, further comprising controlling a viscosity of the material by heating the electrically charged material.

19. The method of claim 16, wherein said separately controlling the thickness of material layers formed on each of the two or more treatment blocks of the three-dimensional target includes providing a different thickness of the material on each of the two or more treatment blocks.

20. The method of claim 16, further comprising controlling the application of the material with a control unit.

21. The method of claim 16, comprising heating the electrically charged material.

22. The method of claim 16, wherein said providing an electrically charged material includes providing a polymer-based material.

23. The method of claim 22, wherein said providing a polymer-based material includes providing one of a plastic and an elastomer.

24. The method of claim 16, wherein said providing an electrically charged material includes providing a multicomponent material.

25. The method of claim 24, further comprising heating and mixing each component of the multi-component material.

26. The method of claim 16, wherein said applying a voltage-level comprises applying different voltages to each of the two or more treatment blocks.

27. The method of claim 26, further comprising maintaining the different voltages substantially constant during a spraying cycle, wherein said establishing an electric field includes establishing a static electric field.

28. The method of claim 16, further comprising, during said spraying step, changing at least one process parameter.

29. The method of claim 28, wherein said changing at least one process parameter includes changing at least one physical parameter of the material.

30. The method of claim 29, wherein said changing at least one physical parameter of the material includes changing at least one of a volume flow and a viscosity.

31. The method of claim 28, wherein said changing at least one process parameter includes changing at least one electrical parameter.

32. The method of claim 31, wherein said changing at least one electrical parameter includes changing at least one of the electrical field, the charge of the electrically charged material, and the voltage applied to each of the two or more treatment blocks.

33. The method of claim 16, further comprising, during said spraying step, changing at least one of the voltages applied to each of the two or more treatment blocks.

34. The method of claim 33, wherein said changing at least one of the voltages includes changing at least one of the voltages to a voltage level which is between minimum and maximum voltage levels.

35. The method of claim 16, further comprising effecting control over particles of the electrically charged material by mechanically controlling the particles.

36. The method of claim 35, wherein said mechanically controlling the particles includes using one of a narrow air jet and an air flow.

37. The method of claim 16, wherein said steps of applying a voltage level to each of the two or more treatment blocks and said establishing an electric field coordinate the paths of particles of the sprayed electrically charged material onto each of the two or more treatment blocks.

* * * * *